United States Patent
Droz et al.

(10) Patent No.: US 9,121,703 B1
(45) Date of Patent: Sep. 1, 2015

(54) METHODS AND SYSTEMS FOR CONTROLLING OPERATION OF A LASER DEVICE

(71) Applicant: Google Inc., Mountain View, CA (US)

(72) Inventors: Pierre-yves Droz, Los Altos, CA (US); Chris Urmson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 13 days.

(21) Appl. No.: 13/916,933

(22) Filed: Jun. 13, 2013

(51) Int. Cl.
*G01C 3/08* (2006.01)
(52) U.S. Cl.
CPC .......................................... *G01C 3/08* (2013.01)
(58) Field of Classification Search
CPC ........ G01C 3/08; G01C 15/002; G01S 17/89; G01S 7/4817; G01S 17/42
USPC ........... 356/3.01, 3.09, 4.01, 4.07, 5.01, 5.09, 356/9, 625
See application file for complete search history.

(56) References Cited

U.S. PATENT DOCUMENTS

| | | | |
|---|---|---|---|
| 5,389,785 A | | 2/1995 | Steiner et al. |
| 2002/0070342 A1* | | 6/2002 | Berenz et al. ................. 250/353 |
| 2002/0125018 A1* | | 9/2002 | Bernhardt et al. ............ 172/439 |
| 2006/0187995 A1* | | 8/2006 | Peters et al. .................... 372/96 |
| 2009/0273770 A1 | | 11/2009 | Bauhahn et al. |
| 2010/0271047 A1* | | 10/2010 | Soerensen et al. ............ 324/658 |
| 2011/0216304 A1 | | 9/2011 | Hall |
| 2011/0311224 A1* | | 12/2011 | Scherbarth ...................... 398/39 |
| 2012/0242974 A1 | | 9/2012 | LaValley et al. |
| 2013/0169685 A1* | | 7/2013 | Lynch ........................... 345/634 |
| 2014/0088761 A1* | | 3/2014 | Shamlian et al. ............. 700/253 |

FOREIGN PATENT DOCUMENTS

DE 4444828 6/1996

OTHER PUBLICATIONS

International Standard, Safety of Laser Products, Part 1: Equipment classification requirements and user's guide, IEC 60825-1, Edition 1.2, Aug. 2001.

* cited by examiner

*Primary Examiner* — Luke Ratcliffe
*Assistant Examiner* — Samantha K Abraham
(74) *Attorney, Agent, or Firm* — McDonnell Boehnen Hulbert & Berhoff LLP (57) ABSTRACT

Example methods and systems for controlling operation of a laser device are provided. A method may include receiving an output of a proximity sensor that is positioned adjacent to a laser device, and determining based on the output of the proximity sensor that an object is within a threshold distance to the laser device. The method may also include based on the laser device emitting laser pulses, providing, by a computing device, instructions to discontinue the emission of laser pulses by the laser device based on the object being within the threshold distance. The method may further include based on the laser device being inactive, providing, by the computing device, instructions to prevent the emission of laser pulses by the laser device based on the object being within the threshold distance.

18 Claims, 6 Drawing Sheets

METHODS AND SYSTEMS FOR CONTROLLING OPERATION OF A LASER DEVICE

BACKGROUND

Unless otherwise indicated herein, the materials described in this section are not prior art to the claims in this application and are not admitted to be prior art by inclusion in this section.

LIDAR (laser imaging detection and radar) sensors emit high power infrared light that can be harmful to human eyes. As light become spread by the sensor during a scanning of an environment, potential for damage or harm is present. Traditional mitigations for eye safety involve spreading the laser beam on a wide aperture or reducing optical power to bring peak intensity under a safe threshold. However, such techniques reduce a range of the sensor and can cause the sensor to be overly complex.

In some instances, LIDAR sensors may be operated in close proximity to humans. For example, autonomous vehicles use various computing systems to aid in the transport of passengers from one location to another, and such vehicles are typically equipped with various types of sensors to detect objects in the surroundings. An autonomous vehicle may include lasers, sonar, radar, cameras, and other devices which scan and record data from surroundings of the vehicle. Sensor data from one or more of these devices may be used to detect objects and their respective characteristics (position, shape, heading, speed, etc.). This detection and identification is useful for the safe operation of autonomous vehicle; however, such detection and identification may be harmful for anyone in close proximity to the laser devices.

SUMMARY

Within examples, devices, systems, and methods for controlling operation of a laser device are provided.

In one example, a method is provided that comprises receiving an output of a proximity sensor that is positioned adjacent to a laser device, and the laser device is configured to emit laser pulses. The method also includes determining based on the output of the proximity sensor that an object is within a threshold distance to the laser device. The method also includes based on the laser device emitting laser pulses, providing, by a computing device, instructions to discontinue the emission of laser pulses by the laser device based on the object being within the threshold distance. The method also includes based on the laser device being inactive, providing, by the computing device, instructions to prevent the emission of laser pulses by the laser device based on the object being within the threshold distance.

In another example, a non-transitory computer readable storage medium having stored therein instructions, that when executed by a computing device, cause the computing device to perform functions. The functions comprise receiving an output of a proximity sensor that is positioned adjacent to a laser device, and the laser device is configured to emit laser pulses. The functions also comprise determining based on the output of the proximity sensor that an object is within a threshold distance to the laser device. The functions also comprise based on the laser device emitting laser pulses, providing instructions to discontinue the emission of laser pulses by the laser device based on the object being within the threshold distance. The functions also comprise based on the laser device being inactive, providing instructions to prevent the emission of laser pulses by the laser device based on the object being within the threshold distance.

In still another example, a system is provided that comprises at least one processor, and data storage comprising instructions, that when executed by the at least one processor, cause the system to perform functions. The functions comprise receiving an output of a proximity sensor that is positioned adjacent to a laser device, and the laser device is configured to emit laser pulses. The functions also comprise determining based on the output of the proximity sensor that an object is within a threshold distance to the laser device. The functions also comprise based on the laser device emitting laser pulses, providing instructions to discontinue the emission of laser pulses by the laser device based on the object being within the threshold distance. The functions also comprise based on the laser device being inactive, providing instructions to prevent the emission of laser pulses by the laser device based on the object being within the threshold distance.

In still another example, a device is provided comprising a means for receiving an output of a proximity sensor that is positioned adjacent to a laser device, and the laser device is configured to emit laser pulses. The device also includes a means for determining based on the output of the proximity sensor that an object is within a threshold distance to the laser device. The device also comprises a means for, based on the laser device emitting laser pulses, providing instructions to discontinue the emission of laser pulses by the laser device based on the object being within the threshold distance. The device also comprises a means for, based on the laser device being inactive, providing instructions to prevent the emission of laser pulses by the laser device based on the object being within the threshold distance.

These as well as other aspects, advantages, and alternatives, will become apparent to those of ordinary skill in the art by reading the following detailed description, with reference where appropriate to the accompanying figures.

DETAILED DESCRIPTION

The following detailed description describes various features and functions of the disclosed systems and methods with reference to the accompanying figures. In the figures, similar symbols identify similar components, unless context dictates otherwise, and the figures or components of the figures may not necessarily be drawn to scale for illustration purposes. The illustrative system and method embodiments described herein are not meant to be limiting. It may be readily understood that certain aspects of the disclosed systems and methods can be arranged and combined in a wide variety of different configurations, all of which are contemplated herein.

Within examples, methods and systems are provided for controlling operation of a laser device. Laser devices emit high power light that can be harmful to human eyes. Light becomes spread by the laser device while the device is scanning its surroundings, and the potential for harm to a person depends on the distance between the eye and the laser device. Some mitigations for eye safety involve spreading the laser beam on a wide aperture or reducing the optical power to bring a peak intensity under the safe threshold. However, these examples may reduce a range of the sensor and can make the device complex. Other examples may include physically prevent a person to be too close to the sensor by using a baffle, a glass window, or some shielding, which can cause the sensor to be significantly larger in size.

In examples where the laser device is a LIDAR coupled to a vehicle configured to operate in an autonomous mode, the LIDAR may be turned off when an object is sensed to be too close to the LIDAR. Proximity sensors may be positioned adjacent the LIDAR and used to determine when an object is within a threshold distance to trigger shutting off the LIDAR, or in some examples, outputs of the LIDAR can be used to determine objects within a threshold distance such that the LIDAR can turn itself off whenever it senses an object within a minimum distance. Thus, within one example, a method is provided that comprises determining, based on an output of a proximity sensor coupled to a vehicle and positioned adjacent to a laser device that is coupled to the vehicle, that an object is within a threshold distance to the laser device. The method also includes providing, by a computing device, instructions to control emission of laser pulses by the laser device based on the object being within the threshold distance.

Example methods may be useful within autonomous vehicles that use various computing systems to aid in the transport of passengers from one location to another. Such vehicles are typically equipped with various types of sensors in order to detect objects in the surroundings. For example, an autonomous vehicle may include lasers, sonar, radar, cameras, and other devices which scan and record data from surroundings of the vehicle. Sensor data from one or more of these devices may be used to detect objects and their respective characteristics (position, shape, heading, speed, etc.). This detection and identification is useful for the safe operation of autonomous vehicle, and operation of the laser devices can be performed in a safe manner.

Example systems within the scope of the present disclosure will now be described in greater detail. Generally, an example system may be implemented in or may take the form of an automobile. However, an example system may also be implemented in or take the form of other vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well. Example systems may also take the form of a laser device independent of operation of a vehicle, and functionality herein can be performed to control operation of the laser device.

Figure 1:
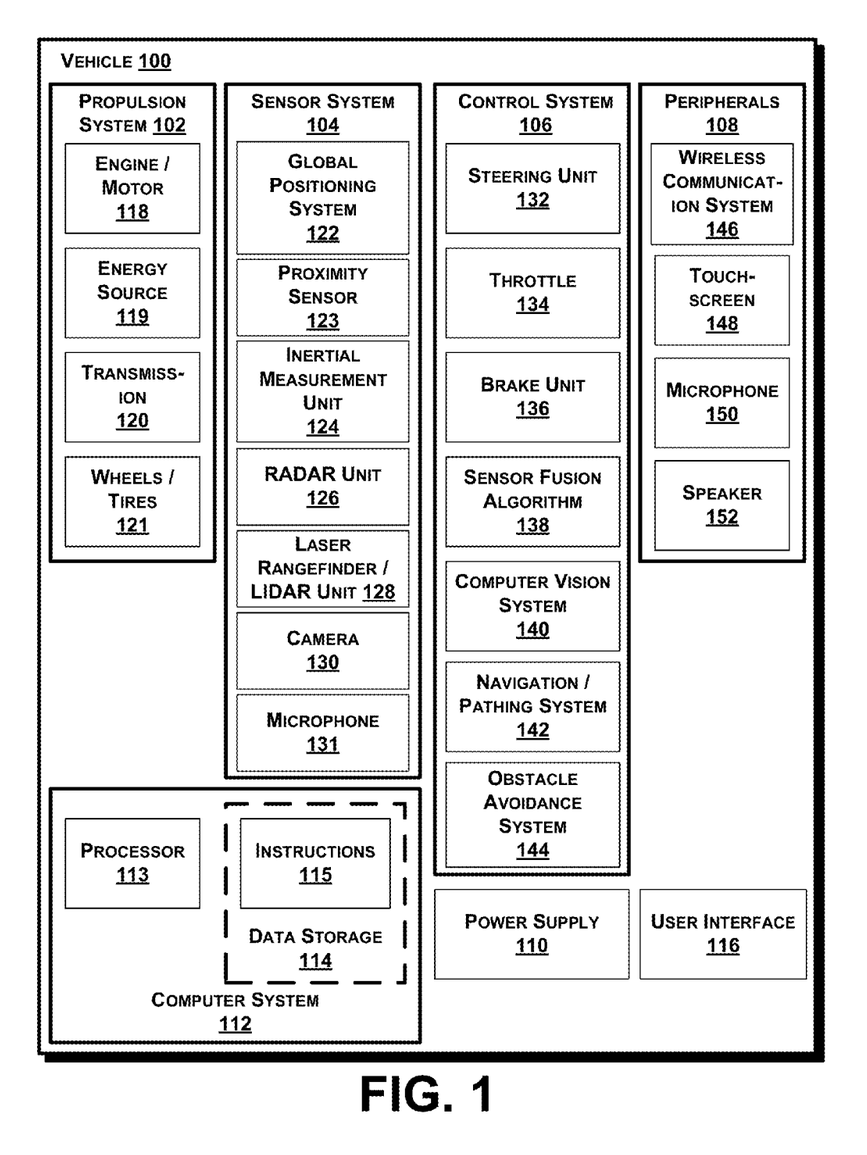
FIG. 1 is a functional block diagram depicting a vehicle according to an example embodiment.

FIG. 1 is a functional block diagram depicting a vehicle 100 according to an example embodiment. The vehicle 100 is configured to operate fully or partially in an autonomous mode, and thus may be referred to as an "autonomous vehicle." For example, a computer system 112 may control the vehicle 100 while in an autonomous mode via control instructions to a control system 106 for the vehicle 100. The computer system 112 may receive information from a sensor system 104, and base one or more control processes (such as the setting a heading so as to avoid a detected obstacle) upon the received information in an automated fashion.

The vehicle 100 may be fully autonomous or partially autonomous. In a partially autonomous vehicle some functions can optionally be manually controlled (e.g., by a driver) some or all of the time. Further, a partially autonomous vehicle may be configured to switch between a fully-manual operation mode and a partially-autonomous and/or a fully-autonomous operation mode. In addition, some autonomous vehicles may require an initial input or continuous input from an operator, such as a pilot, driver, or passenger. Other autonomous systems, for example autopilot systems, may be used when the system has been engaged, which permits the operator to switch from a manual mode (where the operator exercises a high degree of control over the movement of the vehicle) to an autonomous mode (where the vehicle essentially drives itself) to modes that lie somewhere in between.

The vehicle 100 may include various subsystems such as a propulsion system 102, a sensor system 104, a control system 106, one or more peripherals 108, as well as a power supply 110, a computer system 112, and a user interface 116. The vehicle 100 may include more or fewer subsystems and each subsystem may include multiple elements. Further, each of the subsystems and elements of vehicle 100 may be interconnected. Thus, one or more of the described functions of the vehicle 100 may be divided up into additional functional or physical components, or combined into fewer functional or physical components. In some further examples, additional functional and/or physical components may be added to the examples illustrated by FIG. 1.

The propulsion system 102 may include components operable to provide powered motion to the vehicle 100. Depending upon the embodiment, the propulsion system 102 may include an engine/motor 118, an energy source 119, a transmission 120, and wheels/tires 121. The engine/motor 118 could be any combination of an internal combustion engine, an electric motor, steam engine, Stirling engine, or other types of engines and/or motors. In some embodiments, the propulsion system 102 may include multiple types of engines and/or motors. For instance, a gas-electric hybrid vehicle may include a gasoline engine and an electric motor. Other examples are possible as well.

The energy source 119 may represent a source of energy that may, in full or in part, power the engine/motor 118. That is, the engine/motor 118 may be configured to convert the energy source 119 into mechanical energy to operate the transmission 120. Examples of energy sources 119 may include gasoline, diesel, other petroleum-based fuels, propane, other compressed gas-based fuels, ethanol, solar panels, batteries, capacitors, flywheels, regenerative braking systems, and/or other sources of electrical power, etc. The energy source 119 may also provide energy for other systems of the automobile 100.

The transmission 120 may include elements that are operable to transmit mechanical power from the engine/motor 118 to the wheels/tires 121. Such elements may include a gearbox, a clutch, a differential, a drive shaft, and/or axle(s), etc. The transmission 120 may include other elements as well. The drive shafts may include one or more axles that may be coupled to the one or more wheels/tires 121.

The wheels/tires 121 may be arranged to stably support the vehicle 100 while providing frictional traction with a surface, such as a road, upon which the vehicle 100 moves. Accordingly, the wheels/tires 121 of vehicle 100 may be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 may represent at least one wheel that is fixedly attached to the transmission 120 and at least one tire coupled to a rim of the wheel that could make contact with the driving surface. The wheels/tires 121 may include any combination of metal and rubber, or another combination of materials.

The sensor system 104 generally includes one or more sensors configured to detect information about the environment surrounding the vehicle 100. For example, the sensor system 104 may include a Global Positioning System (GPS) 122, a proximity sensor 123, an inertial measurement unit (IMU) 124, a RADAR unit 126 (radio detection and ranging), a laser rangefinder/LIDAR unit 128 (laser imaging detection and ranging), a camera 130, and/or a microphone 131. The sensor system 104 may also include sensors configured to monitor internal systems of the vehicle 100 (e.g., $O_2$ monitor, fuel gauge, engine oil temperature, wheel speed sensors, etc.). One or more of the sensors included in the sensor system 104 may be configured to be actuated separately and/or collectively in order to modify a position and/or an orientation of the one or more sensors.

Sensors in the sensor system 104 may be configured to provide data that is processed by the computer system 112 in real-time. For example, sensors may continuously update outputs to reflect an environment being sensed at or over a range of time, and continuously or as-demanded provide that updated output to the computer system 112 so that the computer system 112 can determine whether the vehicle's then current direction or speed should be modified in response to the sensed environment.

The GPS 122 may be any sensor configured to estimate a geographic location of the vehicle 100. To this end, GPS 122 may include a transceiver operable to provide information regarding the position of the vehicle 100 with respect to the Earth.

The proximity sensor 123 may be mounted on a roof of the vehicle 100, and may be positioned adjacent to the LIDAR unit 128. The proximity sensor 123 may also be mounted at various other locations, such as at or near a location of headlamps, etc., and the LIDAR unit 128 may also be positioned adjacent to the proximity sensor 123. The proximity sensor 123 may be provided as a separate component or separate sensor from other sensors within the sensor system 104. The proximity sensor 123 may be configured to evaluate whether an object is close to the proximity sensor 123. The proximity sensor 123 may be of different types, including inductive sensors configured to sense metallic objects, capacitive sensors configured to sense dielectrics, and optical sensors configured to sense opaque objects, for example. In further examples, the proximity sensor may be configured to sense black body infrared radiation emitted by objects. As a specific example, the proximity sensor may be configured to emit infrared light in a direction of emission of laser pulses by the LIDAR unit 128 and to determine an amount of returned infrared light.

In another example, the proximity sensor 123 may be optical sensor that uses a different wavelength than the LIDAR unit 128. The proximity sensor 123 may be passive and sense the 37 degree Celsius black body infrared radiation emitted by human skin, or active and send infrared light toward a space in front of the LIDAR unit 128 and measure an amount of returned light. The proximity sensor 123 may be any number or combination of sensors as well.

The IMU 124 may include any combination of sensors (e.g., accelerometers and gyroscopes) configured to sense position and orientation changes of the vehicle 100 based on inertial acceleration.

The RADAR unit 126 may represent a system that utilizes radio signals to sense objects within the local environment of the vehicle 100. In some embodiments, in addition to sensing the objects, the RADAR unit 126 may additionally be configured to sense the speed and/or heading of the objects.

Similarly, the laser rangefinder or LIDAR unit 128 may be any sensor configured to sense objects in the environment in which the vehicle 100 is located using lasers. Depending upon the embodiment, the laser rangefinder/LIDAR unit 128 could include one or more laser sources, a laser scanner, and one or more detectors, among other system components. The laser rangefinder/LIDAR unit 128 could be configured to operate in a coherent (e.g., using heterodyne detection) or an incoherent detection mode. In some examples, the LIDAR unit 128 is configured to measure a distance to an object by sending laser pulses and counting a time for propagation from the LIDAR unit 128 to the object and back.

The camera 130 may include one or more devices configured to capture a plurality of images of the environment surrounding the vehicle 100. The camera 130 may be a still camera or a video camera. In some embodiments, the camera 130 may be mechanically movable such as by rotating and/or tilting a platform to which the camera is mounted. As such, a control process of the vehicle 100 may be implemented to control the movement of the camera 130.

The sensor system 104 may also include a microphone 131. The microphone 131 may be configured to capture sound from the environment surrounding the vehicle 100. In some cases, multiple microphones can be arranged as a microphone array, or possibly as multiple microphone arrays.

The control system 106 may be configured to control operation(s) of the vehicle 100 and its components. Accordingly, the control system 106 may include various elements include steering unit 132, throttle 134, brake unit 136, a sensor fusion algorithm 138, a computer vision system 140, a navigation/pathing system 142, and an obstacle avoidance system 144, etc.

The steering unit 132 may represent any combination of mechanisms that may be operable to adjust the heading of vehicle 100. For example, the steering unit 132 can adjust the axis (or axes) of one or more of the wheels/tires 121 so as to effect turning of the vehicle 100. The throttle 134 may be configured to control, for instance, the operating speed of the engine/motor 118 and, in turn, control the speed of the vehicle 100. The brake unit 136 may include any combination of mechanisms configured to decelerate the vehicle 100. The brake unit 136 may, for example, use friction to slow the wheels/tires 121. In other embodiments, the brake unit 136 inductively decelerates the wheels/tires 121 by a regenerative braking process to convert kinetic energy of the wheels/tires 121 to electric current. The brake unit 136 may take other forms as well.

The sensor fusion algorithm 138 may be an algorithm (or a computer program product storing an algorithm) configured to accept data from the sensor system 104 as an input. The data may include, for example, data representing information sensed at the sensors of the sensor system 104. The sensor fusion algorithm 138 may include or be configured to be executed using, for instance, a Kalman filter, Bayesian network, or other algorithm. The sensor fusion algorithm 138 may provide various assessments based on the data from sensor system 104. Depending upon the embodiment, the assessments may include evaluations of individual objects and/or features in the environment of vehicle 100, evaluations of particular situations, and/or evaluations of possible impacts based on the particular situation. Other assessments are possible.

The computer vision system 140 may be any system operable to process and analyze images captured by camera 130 in order to identify objects and/or features in the environment of vehicle 100 that could include traffic signals, road way boundaries, other vehicles, pedestrians, and/or obstacles, etc. The computer vision system 140 may use an object recognition algorithm, a Structure From Motion (SFM) algorithm, video tracking, and other computer vision techniques. In some embodiments, the computer vision system 140 could be additionally configured to map an environment, track objects, estimate the speed of objects, etc.

The navigation and pathing system 142 may be any system configured to determine a driving path for the vehicle 100. For example, the navigation/pathing system 142 may determine a series of speeds and directional headings to effect movement of the vehicle 100 along a path that substantially avoids perceived obstacles while generally advancing the vehicle 100 along a roadway-based path leading to an ultimate destination, which may be set according to user inputs via the user interface 116, for example. The navigation and pathing system 142 may additionally be configured to update the driving path dynamically while the vehicle 100 is in operation. In some embodiments, the navigation and pathing system 142 could be configured to incorporate data from the sensor fusion algorithm 138, the GPS 122, and one or more predetermined maps so as to determine the driving path for vehicle 100.

The obstacle avoidance system 144 may represent a control system configured to identify, evaluate, and avoid or otherwise negotiate potential obstacles in the environment of the vehicle 100. For example, the obstacle avoidance system 144 may effect changes in the navigation of the vehicle 100 by operating one or more subsystems in the control system 106 to undertake swerving maneuvers, turning maneuvers, braking maneuvers, etc. In some embodiments, the obstacle avoidance system 144 is configured to automatically determine feasible ("available") obstacle avoidance maneuvers on the basis of surrounding traffic patterns, road conditions, etc. For example, the obstacle avoidance system 144 may be configured such that a swerving maneuver is not undertaken when other sensor systems detect vehicles, construction barriers, other obstacles, etc. in the region adjacent the vehicle 100 that would be swerved into. In some embodiments, the obstacle avoidance system 144 may automatically select the maneuver that is both available and maximizes safety of occupants of the vehicle. For example, the obstacle avoidance system 144 may select an avoidance maneuver predicted to cause the least amount of acceleration in a passenger cabin of the vehicle 100.

The control system 106 may additionally or alternatively include components other than those shown and described.

The vehicle 100 also includes peripherals 108 configured to allow interaction between the vehicle 100 and external sensors, other vehicles, other computer systems, and/or a user, such as an occupant of the vehicle 100. For example, the peripherals 108 for receiving information from occupants, external systems, etc. may include a wireless communication system 146, a touchscreen 148, a microphone 150, and/or a speaker 152.

In some embodiments, the peripherals 108 function to receive inputs for a user of the vehicle 100 to interact with the user interface 116. To this end, the touchscreen 148 can both provide information to a user of the vehicle 100, and convey information from the user indicated via the touchscreen 148 to the user interface 116. The touchscreen 148 can be configured to sense both touch positions and touch gestures from the finger of a user (or stylus, etc.) via capacitive sensing, resistance sensing, optical sensing, a surface acoustic wave process, etc. The touchscreen 148 can be capable of sensing finger movement in a direction parallel or planar to the touchscreen surface, in a direction normal to the touchscreen surface, or both, and may also be capable of sensing a level of pressure applied to the touchscreen surface. An occupant of the vehicle 100 can also utilize a voice command interface. For example, the microphone 150 can be configured to receive audio (e.g., a voice command or other audio input) from an occupant of the vehicle 100. Similarly, the speaker 152 can be configured to output audio to the occupant of the vehicle 100.

In some embodiments, the peripherals 108 function to allow communication between the vehicle 100 and external systems, such as devices, sensors, other vehicles, etc. within its surrounding environment and/or controllers, servers, etc., physically located far from the vehicle 100 that provide useful information regarding the vehicle's surroundings, such as traffic information, weather information, etc. For example, the wireless communication system 146 can wirelessly communicate with one or more devices directly or via a communication network. The wireless communication system 146 can optionally use 3G cellular communication, such as CDMA, EVDO, GSM/GPRS, and/or 4G cellular communication, such as WiMAX or LTE. Additionally or alternatively, the wireless communication system 146 can communicate with a wireless local area network (WLAN), for example, using WiFi. In some embodiments, the wireless communication system 146 could communicate directly with a device, for example, using an infrared link, short-range wireless link, etc. The wireless communication system 146 can include one or more dedicated short range communication (DSRC) devices that can include public and/or private data communications between vehicles and/or roadside stations. Other wireless protocols for sending and receiving information embedded in signals, such as various vehicular communication systems, can also be employed by the wireless communication system 146 within the context of the present disclosure.

The power supply 110 may provide power to components of the vehicle 100, such as electronics in the peripherals 108, the computer system 112, the sensor system 104, etc. The power supply 110 can include a rechargeable lithium-ion or lead-acid battery for storing and discharging electrical energy to the various powered components, for example. In some embodiments, one or more banks of batteries may be configured to provide electrical power. In some embodiments, the power supply 110 and the energy source 119 can be implemented together, as in some all-electric cars.

Many or all of the functions of the vehicle 100 may be controlled via the computer system 112 that receives inputs from the sensor system 104, the peripherals 108, etc., and communicates appropriate control signals to the propulsion system 102, the control system 106, the peripherals 108, etc. to effect automatic operation of the vehicle 100 based on its surroundings. The computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, data storage 114 may contain instructions 115 (e.g., program logic) executable by the processor 113 to execute various automobile functions, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 at during the operation of the vehicle 100 in the autonomous, semi-autonomous, and/or manual modes.

The vehicle 100, and associated computer system 112, provides information to and/or receives input from, a user of the vehicle 100, such as an occupant in a passenger cabin of the vehicle 100. Accordingly, the vehicle 100 may include a user interface 116 for providing information to or receiving input from a user of vehicle 100. The user interface 116 may control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 controls the operation of the vehicle 100 based on inputs received from various subsystems indicating vehicle and/or environmental conditions (e.g., propulsion system 102, sensor system 104, and/or control system 106), as well as inputs from the user interface 116, indicating user preferences. For example, the computer system 112 may utilize input from the control system 106 to control the steering unit 132 to avoid an obstacle detected by the sensor system 104 and the obstacle avoidance system 144. The computer system 112 may be configured to control many aspects of the vehicle 100 and its subsystems. Generally, however, provisions are made for manually overriding automated controller-driven operation, such as in the event of an emergency, or merely in response to a user-activated override, etc.

The components of the vehicle 100 described herein may be configured to work in an interconnected fashion with other components within or outside their respective systems. For example, the camera 130 can capture a plurality of images that represent information about an environment of the vehicle 100 while operating in an autonomous mode. The environment may include other vehicles, traffic lights, traffic signs, road markers, pedestrians, etc. The computer vision system 140 can categorize and/or recognize various aspects in the environment in concert with the sensor fusion algorithm 138, the computer system 112, etc. based on object recognition models pre-stored in the data storage 114, and/or by other techniques.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 may generally be communicatively coupled together in a wired and/or wireless fashion.

Figure 2:
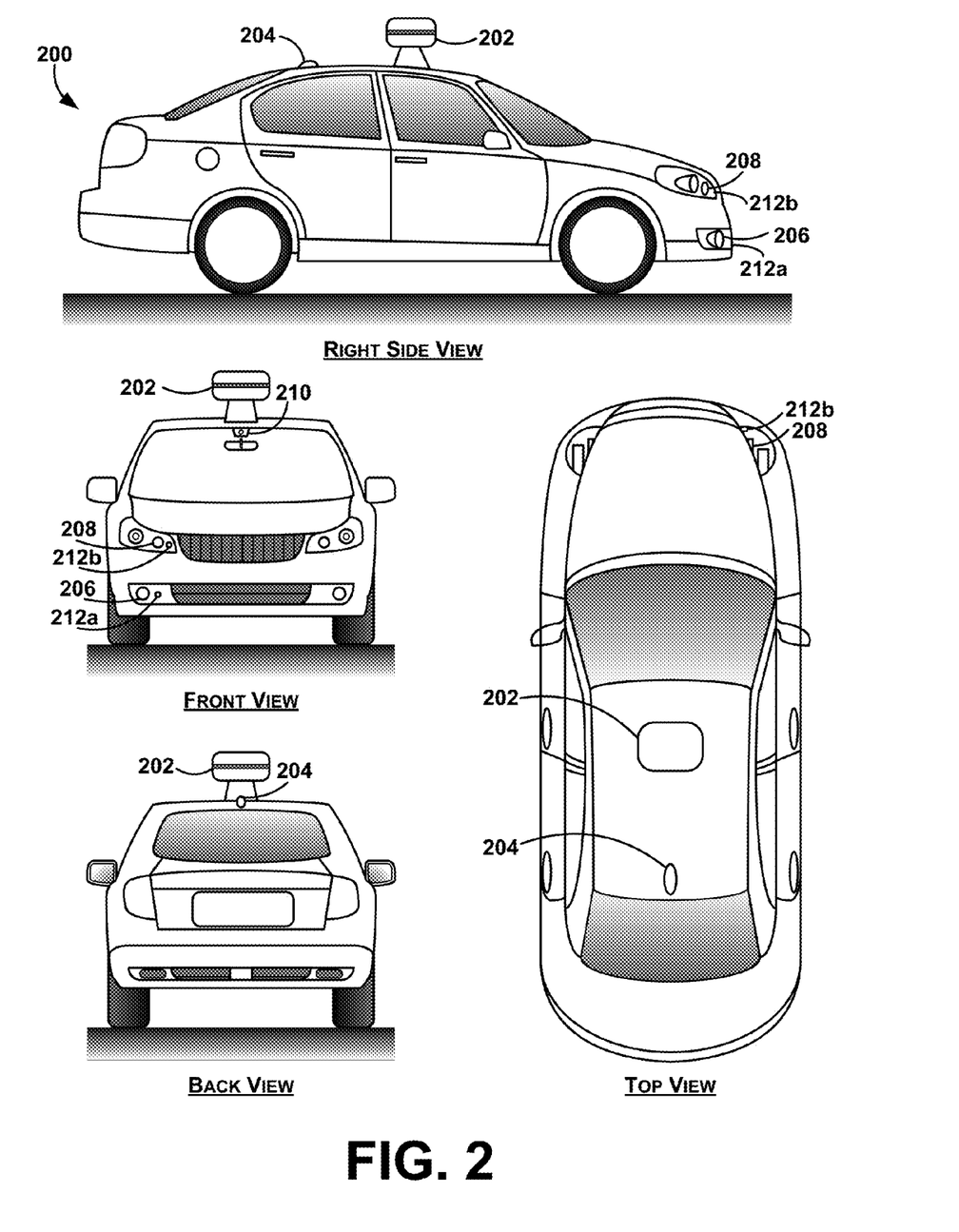
FIG. 2 depicts an example vehicle that can include all or some of the functions described in connection with the vehicle in reference to FIG. 1.

FIG. 2 depicts an example vehicle 200 that can include all or some of the functions described in connection with the vehicle 100 in reference to FIG. 1. Although example vehicle 200 is illustrated in FIG. 2 as a four-wheel sedan-type car for illustrative purposes, the present disclosure is not so limited. For instance, example vehicle 200 can represent any type of vehicle.

Example vehicle 200 includes a sensor unit 202, a wireless communication system 204, a LIDAR unit 206, a laser rangefinder unit 208, and a camera 210. Also, the vehicle 200 includes one or more proximity sensors 212a-b. Furthermore, example vehicle 200 may include any of the components described in connection with vehicle 100 of FIG. 1.

The sensor unit 202 is mounted atop example vehicle 200 and includes one or more sensors configured to detect information about an environment surrounding example vehicle 200, and output indications of the information. For example, the sensor unit 202 may include any combination of cameras, RADARs, LIDARs, range finders, acoustic sensors, and proximity sensors. Any of the sensors in the sensor unit 202 may be separate components included within one housing, or included coupled to the housing. The sensor unit 202 may include one or more movable mounts that may be operable to adjust the orientation of one or more sensors in the sensor unit 202. In one embodiment, the movable mount may include a rotating platform that may scan sensors so as to obtain information from each direction around example vehicle 200. In another embodiment, the movable mount of the sensor unit 202 may be moveable in a scanning fashion within a particular range of angles and/or azimuths. The sensor unit 202 may be mounted atop the roof of a car, for instance, however other mounting locations are possible. Additionally, the sensors of the sensor unit 202 may be distributed in different locations and need not be collocated in a single location. Some possible sensor types and mounting locations include the LIDAR unit 206 and laser rangefinder unit 208. Furthermore, each sensor of the sensor unit 202 may be configured to be moved or scanned independently of other sensors of the sensor unit 202.

The wireless communication system 204 may be located on a roof of example vehicle 200 as depicted in FIG. 2. Alternatively, the wireless communication system 204 may be located, fully or in part, elsewhere. The wireless communication system 204 may include wireless transmitters and receivers that may be configured to communicate with devices external or internal to example vehicle 200. Specifically, the wireless communication system 204 may include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 may be a photo-sensitive instrument, such as a still camera, a video camera, etc., that is configured to capture a plurality of images of the environment of example vehicle 200. To this end, the camera 210 can be configured to detect visible light, and can additionally or alternatively be configured to detect light from other portions of the spectrum, such as infrared or ultraviolet light. The camera 210 can be a two-dimensional detector, and can optionally have a three-dimensional spatial range of sensitivity. In some embodiments, the camera 210 can include, for example, a range detector configured to generate a two-dimensional image indicating distance from the camera 210 to a number of points in the environment. To this end, the camera 210 may use one or more range detecting techniques.

For example, the camera 210 may provide range information by using a structured light technique in which example vehicle 200 illuminates an object in the environment with a predetermined light pattern, such as a grid or checkerboard pattern and uses the camera 210 to detect a reflection of the predetermined light pattern from environmental surroundings. Based on distortions in the reflected light pattern, example vehicle 200 may determine the distance to the points on the object. The predetermined light pattern may comprise infrared light, or radiation at other suitable wavelengths for such measurements.

The camera 210 may be mounted inside a front windshield of example vehicle 200. Specifically, the camera 210 may be situated to capture images from a forward-looking view with respect to the orientation of example vehicle 200. Other mounting locations and viewing angles of the camera 210 may also be used, either inside or outside example vehicle 200.

The camera 210 can have associated optics operable to provide an adjustable field of view. Further, the camera 210 may be mounted to example vehicle 200 with a movable mount to vary a pointing angle of the camera 210, such as a via a pan/tilt mechanism.

The proximity sensors 210*a-b* may be positioned adjacent to the LIDAR unit 206 and the laser rangefinder unit 208. The example vehicle 200 may include additional proximity sensors, such as proximity sensors for parking assist. Alternatively, any of the proximity sensors may be positioned adjacent to the LIDAR unit 206 and configured to provide outputs used for various functions.

Figure 3:
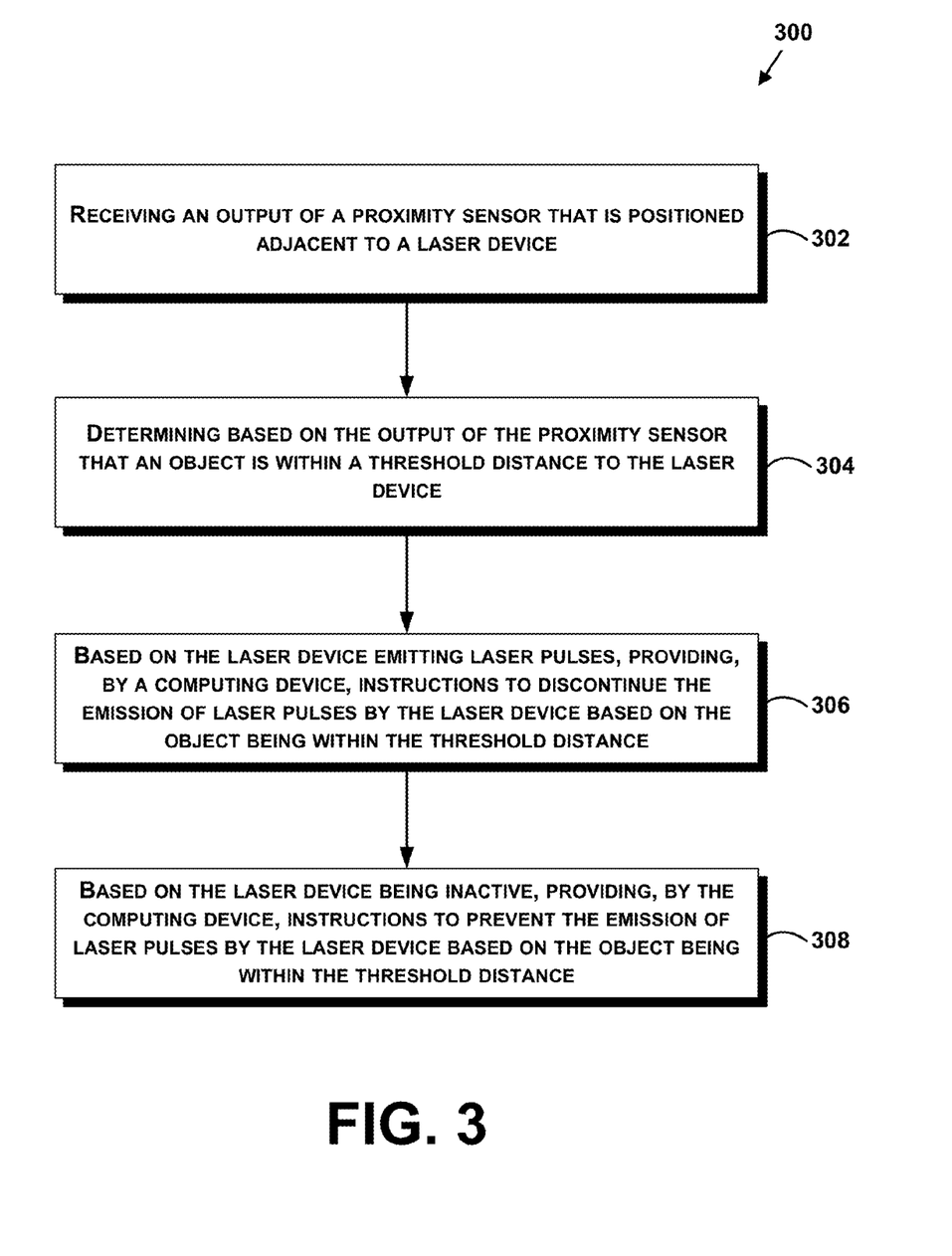
FIG. 3 is a block diagram of an example method for providing instructions to discontinue or prevent emission of lasers based on object detection, in accordance with at least some embodiments described herein.

FIG. 3 is a block diagram of an example method for providing instructions to discontinue or prevent emission of lasers based on object detection, in accordance with at least some embodiments described herein. Method 300 shown in FIG. 3 presents an embodiment of a method that, for example, could be used with the vehicle 100 and/or vehicle 200 as illustrated and described in reference to FIGS. 1 and 2, respectively, or components of the vehicle 100 or vehicle 200. For example, the processes described herein may be carried out by the RADAR unit 126, the LIDAR unit 128, or camera 130 mounted to an autonomous vehicle (e.g., vehicle 200) in communication with the computer system 112, the sensor fusion algorithm 138, and/or the computer vision system 140. Method 300 may include one or more operations, functions, or actions as illustrated by one or more of blocks 302-308. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions (e.g., machine readable code) executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, a computer program product, or other article of manufacture, for example.

The non-transitory computer readable medium could also be distributed among multiple data storage elements, which could be remotely located from each other. A computing device that executes some or all of the stored instructions could be a vehicle, such as the example vehicle 200 illustrated in FIG. 2. Alternatively, the computing device that executes some or all of the stored instructions could be another computing device, such as a server.

In addition, for the method 300 and other processes and methods disclosed herein, each block in FIG. 3 may represent circuitry that is wired to perform the specific logical functions in the process.

Example methods, such as method 300 of FIG. 3 may be carried out in whole or in part by the vehicle and its subsystems. Accordingly, example methods could be described by way of example herein as being implemented by the vehicle. However, it should be understood that an example method may be implemented in whole or in part by other computing devices of the vehicle or separate from the vehicle. For example, an example method may be implemented in whole or in part by a server system, which receives data from a device such as those associated with the vehicle. Other examples of computing devices or combinations of computing devices that can implement an example method are possible.

At block 302, the method 300 includes receiving an output of a proximity sensor that is positioned adjacent to a laser device. The laser device may be a device configured to emit laser pulses, and the proximity sensor may be a device configured to provide an output indicative of presence of an object and/or distance of an object to the proximity sensor. The laser device may be positioned on a vehicle, and the vehicle or components of the vehicle such as a computing device or processor, may be configured to receive the output. In other examples, the method 300 may be performed by a computing device coupled to the laser device. In still other examples, the method 300 may be performed by the laser device itself, or by the proximity sensor as well.

At block 304, the method includes determining based on the output of the proximity sensor that an object is within a threshold distance to the laser device. The computing device may be configured to determine whether the object is within a threshold distance or close in proximity to the laser device. The computing device may be configured to operate the laser device so as to prevent operation of the laser when objects are too close. To guarantee that a laser device is safe for humans to be in close proximity, it may be desired to guarantee that the laser beam cannot be turned on when a human is too close. Thus, the computing device can be configured to determine, based on the output of the proximity sensor that is positioned close to the output aperture of the laser device, whenever an object is sensed within a minimum radius of the aperture. In some examples, the threshold distance may be a distance under about 30 centimeters. In other examples, other threshold distances may be used depending on eye safety limits provided for a class of the laser device. Example threshold distances, or distance ranges, include about 20 centimeters, between 20-50 centimeters, or possibly up to about 5 feet or more.

At block 306, the method includes based on the laser device emitting laser pulses, providing, by a computing device, instructions to discontinue the emission of laser pulses by the laser device based on the object being within the threshold distance. Thus, within examples, when the laser device is being operated and the object is determined to be within the threshold distance (i.e., too close to the laser device for safe operation), the computing device is configured to send instructions to turn off the laser beam.

Within examples, the laser device may be safe to humans when scanning or in instances in which the laser source mechanisms or mirrors are moving to cause the lasers to be spread. However, when the mirrors are stopped and the laser beam intensifies, the laser device may not be safe. In further examples, the computing device may control operation of the laser device so as to discontinue the emission of lasers when internal mirrors or mechanisms of the laser device are not moving.

To provide higher safety, even when the laser device is scanning, when an object is detected within a threshold distance to the laser device, operation of the laser device may be discontinued. To discontinue operation may include suspending operation, stopping emission of laser pulses, turning off the laser device, disabling the laser device, etc. In some examples, to discontinue operation may include providing a shield, cover, or barrier in front of the output of the laser device, in addition to or rather than, stopping emission of laser pulses.

At block 308, the method includes based on the laser device being inactive, providing, by the computing device, instructions to prevent the emission of laser pulses by the laser device based on the object being within the threshold distance. Within examples, when the laser device is inactive or not being operated and the object is determined to be within the threshold distance (i.e., too close to the laser device for safe operation), the computing device is configured to send instructions to prevent turning the laser beam on. To prevent emission of laser pulses may include turning off the laser device, disabling the laser device, not providing power to the laser device, or possibly blocking the laser device with a shield or cover, for example.

Within examples, using the method 300 in FIG. 3, the laser device may be operated at full power (to increase a distance at which objects may be detected) when objects are outside the threshold distance. In addition, the laser device does not require additional components for safety concerns, such as shields or other barriers to mitigate eye safety concerns, since operation of the laser device may be controlled.

Within examples, a vehicle may be configured to operate in an autonomous mode, and operation of the LIDAR unit may be needed to operate in the autonomous mode. Thus, in some examples, based on detection of an object within the threshold distance may cause the LIDAR unit to be turned off, and also, may cause operation of the vehicle to transition into a manual or semi-manual mode as well.

In the method 300 of FIG. 3, the computing device uses outputs of a proximity sensor that is positioned adjacent to the laser device to determine whether objects are within the threshold distance to cause the laser device to discontinue or be prevented from emitting lasers. In other examples, the method 300 may also include receiving laser data collected from scans of an environment of the vehicle by the laser device, and the laser data includes a plurality of laser data points indicative of one or more objects in the environment. The computing device can make a determination of whether the one or more objects is within the threshold distance to the laser device based on the laser data, and then based on the output of the proximity sensor and the laser data both being indicative of a given object being within the threshold distance to the laser device, the computing device can provide instructions to control emission of laser pulses by the laser device so as to discontinue or prevent emission of laser pulses by the laser device. In this manner, the computing device determines presence of an object too close for safe operation with a higher confidence level.

Thus, within examples, the laser device may collect data and can be configured to turn itself off whenever an object is sensed within a minimum radius. Or, as mentioned, outputs from both the proximity sensor and the laser device can be useful for determining when to shut down the laser device to provide independent sensor measurements.

In addition, while the output of the proximity sensor may provide information indicating presence of an object at a distance, the laser data can be processed to determine additional information, such as object detection, and may be able to distinguish between inanimate objects (or other objects where safety is not a concern) and humans. As an example, the vehicle may have a LIDAR unit that illuminates areas around, surrounding, in front of, behind, to the side, or in any proximity or relation to the vehicle, and detects reflected light. In operation, the LIDAR rotates and (e.g., periodically) emits laser beams. Reflections from the emitted laser beams by objects in the environment are then received by suitable sensors. Time-stamping receipt of the reflected signals allows for associating each reflected signal (if any is received at all) with the most recently emitted laser pulse, and measuring the time delay between emission of the laser pulse and reception of the reflected light. The time delay provides an estimate of the distance to the reflective feature by scaling according to the speed of light in the intervening atmosphere. Combining the distance information for each reflected signal with the orientation of the LIDAR device for the respective pulse emission allows for determining a position of the reflective feature in three-dimensions. For illustrative purposes, an environmental scene can be described in the two-dimensional x-y plane in connection with a single sweep of the LIDAR device that estimates positions to a series of points located in the x-y plane. However, it is noted that a more complete three-dimensional sampling is provided by either adjusting beam steering optics to direct the laser beam up or down from the x-y plane on its next sweep of the scene or by providing additional lasers and associated beam steering optics dedicated to sampling point locations in planes above and below the x-y plane, or combinations of these.

In some examples, a point cloud corresponding to objects in the environmental can be generated. Each point in the point cloud can be referenced by an azimuth angle (e.g., orientation of the LIDAR device while emitting the pulse corresponding to the point, which is determined by the orientation of an rotating angled mirror of the LIDAR) and a line-of-sight (LOS) distance (e.g., a distance indicated by the time delay between pulse emission and reflected light reception). For pulses that do not result in a returning reflected signal, the distance in the point map can optionally be set to the maximum distance sensitivity of the LIDAR device. The maximum distance sensitivity can be determined according to the maximum time delay the associated optical sensors wait for a return reflected signal following each pulse emission, which can itself be set according to the anticipated signal strength of a reflected signal at a particular distance given ambient lighting conditions, intensity of the emitted pulse, predicted reflectivity of environmental features, etc. In some examples, the maximum distance can be approximately 60 meters, 80 meters, 100 meters, or 150 meters, but other examples are possible for particular configurations of the LIDAR device and associated optical sensors.

In some embodiments, the sensor fusion algorithm 138, computer vision system 140, and/or computer system 112 illustrated in FIG. 1, can be configured to interpret the collected laser data alone and/or in combination with additional sensor-indicated information and/or memory-based pattern-matching point clouds and/or baseline maps of the environment to categorize or identify group of points as corresponding to objects in the environment. To determine whether an object is present in a laser point cloud image (based on received laser data), object detector software and/or module can associate arrangements of laser-indicated points with patterns matching objects, environmental features, and/or categories of objects or features. The object detector can be pre-loaded (or dynamically instructed) to associate arrangements according to one or more parameters corresponding to physical objects/features in the environment surrounding the vehicle 100. For example, the object detector can be pre-loaded with information indicating a typical height of a pedestrian, a length of a typical automobile, confidence thresholds for classifying suspected objects, etc.

Within examples, based on the laser device being inactive or off, then the computing device can rely on outputs of the proximity sensor to determine whether to operate the laser or to turn on the laser device. When the laser device is on and operating, then the computing device can receive outputs from both the proximity sensor and the laser device to control operations of the laser device.

Figure 4:
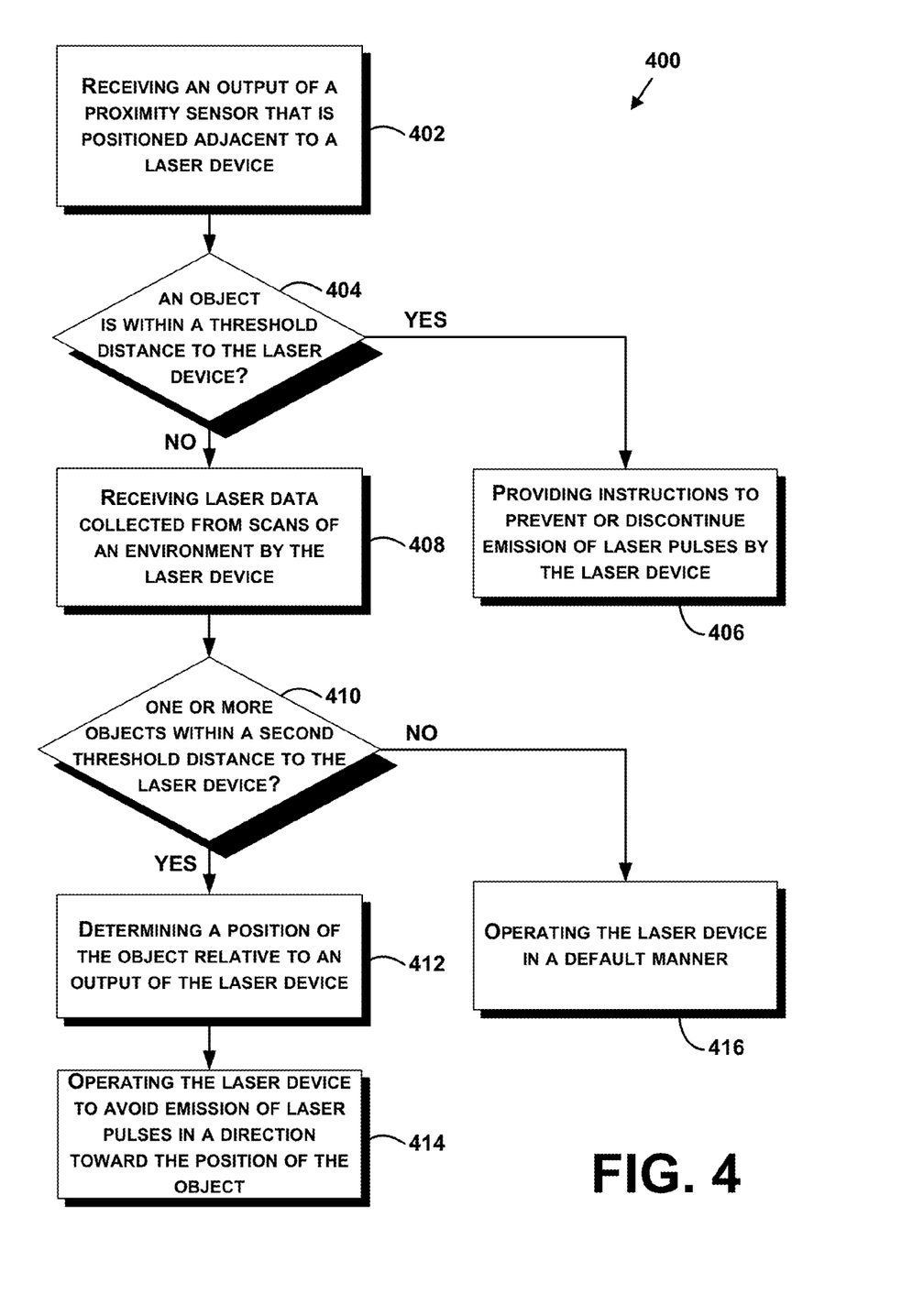
FIG. 4 is a block diagram of an example method for controlling operation of a laser device, in accordance with at least some embodiments described herein.

FIG. 4 is a block diagram of an example method for controlling operation of a laser device, in accordance with at least some embodiments described herein. Method 400 shown in FIG. 4 presents an embodiment of a method that, for example, could be used with the vehicle 100 and/or vehicle 200 as illustrated and described in reference to FIGS. 1 and 2, respectively, or components of the vehicle 100 or vehicle 200. Method 400 may include one or more operations, functions, or actions as illustrated by one or more of blocks 402-416. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation. In addition, each block may represent a module, a segment, or a portion of program code, which includes one or more instructions (e.g., machine readable code) executable by a processor for implementing specific logical functions or steps in the process.

At block 402, the method 400 includes receiving an output of a proximity sensor that is positioned adjacent to a laser device. At block 404, the method 400 includes determining whether an object is within a threshold distance to the laser device. At block 406, the method 400 includes based on the object being within the threshold distance, providing instructions to prevent or discontinue emission of laser pulses by the laser device.

However, at block 408, the method 400 includes based on the object being outside of the threshold distance, receiving laser data collected from scans of an environment by the laser device. At block 410, the method 400 includes determining whether one or more objects within a second threshold distance to the laser device based on the laser data. The second distance may be larger than the first distance, or may define a second distance for a higher safety distance for operation of the laser device. The second distance may be about twice the first threshold, or within a few feet of the laser device.

At block 412, the method 400 includes based on an object being within the second distance, determining a position of the object relative to an output of the laser device based on the laser data. At block 414, the method 400 includes operating the laser device to avoid emission of laser pulses in a direction toward the position of the object. For example, the laser device may be configured to emit laser pulses while rotating, and thus, the laser device can be operated to stop emission of laser pulses by the laser device when the laser device rotates to a direction of the position of the object. In some examples, the computing device can provide instructions to cause the emission of laser pulses by the laser device to turn off when the laser device rotates to the position of the object and to turn on when the laser device rotates past the position of the object.

At block 414, the method 400 includes based on no objects within the second threshold distance, operating the laser device in a default manner.

In further examples, the computing device can control operation of the laser device based on a position of the object. For example, when an object is directly in front of the laser device to be in the direct line of emission of laser pulses, the laser device can be turned off.

In still other examples, the computing device can control operation of the laser device by turning off the laser beam when the object is within the second threshold distance or prior to the object coming into the threshold distance that is detected by the proximity sensor. For example, the laser device may be turned off before the object can be detected by the proximity sensor to provide a larger safety region surrounding the laser device.

In addition or alternatively, the laser device can be operated to emit laser pulses by spreading a laser beam on a wide aperture, or to emit laser pulses using an optical power below a threshold level when the object is within the second threshold distance, and then to be turned off if the object comes within the original threshold distance. In this manner, the laser device can be gradually turned off or have intensity lowered as objects become closer to the output of the laser device or become within an area where harm may occur.

Figure 5A:
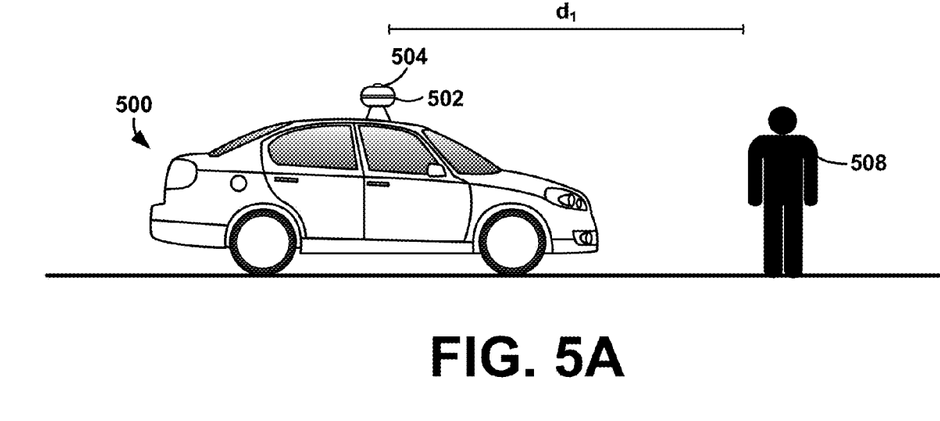
FIGS. 5A-5B are example conceptual side view illustrations of controlling operation of a laser device on a vehicle.
Figure 5B:
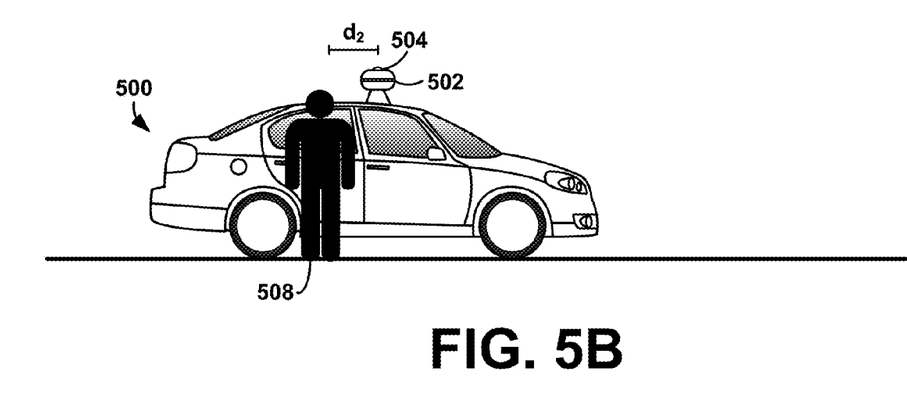

FIGS. 5A-5B are example conceptual side view illustrations of controlling operation of a laser device on a vehicle. In FIG. 5A, a vehicle 500 includes a laser device 502 and a proximity sensor 504 mounted on a roof of the vehicle 500 and adjacent to each other. The proximity sensor 504 may detect a presence of an object 508 (in this example a person) at a distance of $d_1$, from the output of the laser device 502. The distance of $d_1$ may be a safe distance away from the output of the laser device 502 to operate the laser device 502 at full power.

In FIG. 5B, the proximity sensor 504 may detect the presence of the object 508 at a distance of $d_2$, from the output of the laser device 502. The distance of $d_2$ may not be a safe distance away from the output of the laser device 502 to operate the laser device 502 at full power. For example, as the person approaches the vehicle 500, and is next to the vehicle 500, the person may be within about 20 centimeters to the output of the laser device 502 which may be too close to operate the laser device 502. Thus, the laser device 502 can be shut down in the example shown in FIG. 5B.

Figure 6A:
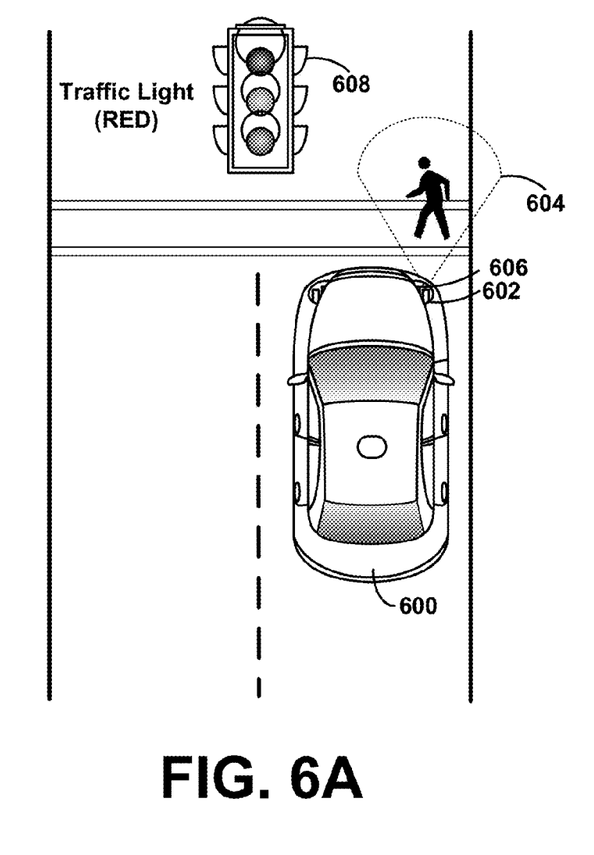
FIGS. 6A-6B are example conceptual illustrations of controlling operation of a laser device on a vehicle.
Figure 6B:
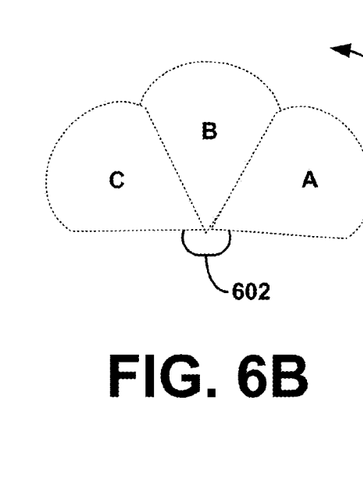

FIGS. 6A-6B are example conceptual illustrations of controlling operation of a laser device on a vehicle. In FIG. 6A, a vehicle 600 includes a laser device 602 that emits laser pulses in an area generally shown as area 604. The vehicle 600 also includes a proximity sensor 606. In the example shown in FIG. 6A, the vehicle has approached a traffic light 608 and is stopped, and the laser device 602 is being operated to detect objects in a surrounding environment of the vehicle 600.

A person may be crossing the street, and the proximity sensor 606 may detect a presence of an object within a threshold distance to the laser device 602. The laser device 602 may now be operated to shut off, or avoid emission of laser pulses in a direction toward the person. For example, as shown in FIG. 6B, the laser device 602 may rotate while scanning the environment, and may emit pulses in scans labeled as zones A, B, C. In the example in FIG. 6A, the laser device 602 can be operated to skip zone B during scanning so as to avoid emission of laser pulses in a direction toward the person, for example.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
    receiving an output of a proximity sensor that is positioned adjacent to a laser device, wherein the laser device is configured to emit laser pulses;
    determining based on the output of the proximity sensor that one or more objects are within a threshold distance to the laser device;
    receiving laser data collected from scans of an environment by the laser device, wherein the laser data includes a plurality of laser data points indicative of the one or more objects in the environment;
    making a determination of whether the one or more objects are within the threshold distance to the laser device based on the laser data;
    when the laser device is emitting laser pulses, providing, by a computing device, instructions to discontinue the emission of laser pulses by the laser device based on the output of the proximity sensor and the laser data both being indicative of the one or more objects being within the threshold distance to the laser device; and
    when the laser device is inactive, providing, by the computing device, instructions to prevent the emission of laser pulses by the laser device based on the output of the proximity sensor being indicative of the one or more objects being within the threshold distance to the laser device.

2. The method of claim 1, further comprising:
    determining that the one or more objects are within a second threshold distance to the laser device, wherein the second threshold distance is greater than the threshold distance; and
    based on the laser device emitting laser pulses, providing instructions to emit laser pulses by spreading a laser beam on a wide aperture.

3. The method of claim 1, further comprising:
    determining that the one or more objects are within a second threshold distance to the laser device, wherein the second threshold distance is greater than the threshold distance; and
    based on the laser device emitting laser pulses, providing instructions to emit laser pulses using an optical power below a threshold level.

4. The method of claim 1, further comprising:
    receiving laser data collected from scans of an environment by the laser device, wherein the laser data includes a plurality of laser data points indicative of the one or more objects in the environment;
    determining that the one or more objects is within a second threshold distance to the laser device, wherein the second threshold distance is greater than the threshold distance; and
    based on the laser device emitting laser pulses, providing instructions to discontinue the emission of laser pulses by the laser device based on the one or more objects being within the second threshold distance.

5. The method of claim 1, further comprising:
    determining a position of the one or more objects relative to an output of the laser device; and
    based on the position of the one or more objects, determining whether to provide the instructions to discontinue or prevent the emission of laser pulses by the laser device.

6. The method of claim 5, wherein the laser device is configured to emit laser pulses while rotating, and the method further comprises:
    providing instructions to stop emission of laser pulses by the laser device when the laser device rotates to a direction of the position of the one or more objects.

7. The method of claim 5, wherein the laser device is configured to emit laser pulses while rotating, and the method further comprises:
    providing instructions to cause the emission of laser pulses by the laser device to turn off when the laser device rotates to the position of the one or more objects and to turn on when the laser device rotates past the position of the one or more objects.

8. The method of claim 1, wherein the laser device is a light detection and ranging sensor (LIDAR) that is coupled to a vehicle, and the vehicle is configured to operate in an autonomous mode.

9. The method of claim 1, wherein the proximity sensor includes one or more sensors selected from the group consisting of an inductive sensor configured to sense a metallic object, a capacitive sensor configured to sense a dielectric object, and an optical sensor configured to sense an opaque object.

10. The method of claim 1, wherein the proximity sensor is configured to sense black body infrared radiation emitted by the one or more objects.

11. The method of claim 1, wherein the proximity sensor is configured to emit infrared light in a direction of emission of laser pulses by the laser device and to determine an amount of returned infrared light.

12. The method of claim 1, wherein the threshold distance is a distance under about 30 centimeters.

13. The method of claim 1, wherein the laser device is mounted on a roof of a vehicle, and the proximity sensor is mounted on the roof of the vehicle adjacent to the laser device, wherein the laser device and the proximity sensor are separate components.

14. A system comprising:
    at least one processor; and data storage comprising instructions, that when executed by the at least one processor, cause the system to perform functions comprising:
- receiving an output of a proximity sensor that is positioned adjacent to a laser device, wherein the laser device is configured to emit laser pulses;
- determining based on the output of the proximity sensor that one or more objects are within a threshold distance to the laser device;
- receiving laser data collected from scans of an environment by the laser device, wherein the laser data includes a plurality of laser data points indicative of the one or more objects in the environment;
- making a determination of whether the one or more objects are within the threshold distance to the laser device based on the laser data;
- when the laser device is emitting laser pulses, providing instructions to discontinue the emission of laser pulses by the laser device based on the output of the proximity sensor and the laser data both being indicative of the one or more objects being within the threshold distance to the laser device; and
- when the laser device is inactive, providing instructions to prevent the emission of laser pulses by the laser device based on the output of the proximity sensor being indicative of the one or more objects being within the threshold distance to the laser device.

15. The system of claim 14, wherein the functions further comprise:
- determining that the one or more objects are within a second threshold distance to the laser device, wherein the second threshold distance is greater than the threshold distance; and
- based on the laser device emitting laser pulses, providing instructions to emit laser pulses by spreading a laser beam on a wide aperture or using an optical power below a threshold level.

16. A non-transitory computer readable storage medium having stored therein instructions, that when executed by a computing device, cause the computing device to perform functions comprising:
- receiving an output of a proximity sensor that is positioned adjacent to a laser device, wherein the laser device is configured to emit laser pulses;
- determining based on the output of the proximity sensor that one or more objects are within a threshold distance to the laser device;
- receiving laser data collected from scans of an environment by the laser device, wherein the laser data includes a plurality of laser data points indicative of the one or more objects in the environment;
- making a determination of whether the one or more objects are within the threshold distance to the laser device based on the laser data;
- when the laser device is emitting laser pulses, providing instructions to discontinue the emission of laser pulses by the laser device based on the output of the proximity sensor and the laser data both being indicative of the one or more objects being within the threshold distance to the laser device; and
- when the laser device is inactive, providing instructions to prevent the emission of laser pulses by the laser device based on the output of the proximity sensor being indicative of the one or more objects being within the threshold distance to the laser device.

17. The non-transitory computer readable storage medium of claim 16, wherein the functions further comprise:
- receiving laser data collected from scans of an environment by the laser device, wherein the laser data includes a plurality of laser data points indicative of the one or more objects in the environment;
- determining that the one or more objects is within a second threshold distance to the laser device, wherein the second threshold distance is greater than the threshold distance; and
- based on the laser device emitting laser pulses, providing instructions to discontinue the emission of laser pulses by the laser device based on the one or more objects being within the second threshold distance.

18. The non-transitory computer readable storage medium of claim 16, wherein the laser device is configured to emit laser pulses while rotating, and wherein the functions further comprise:
- determining a position of the one or more objects relative to an output of the laser device; and
- providing instructions to cause the emission of laser pulses by the laser device to turn off when the laser device rotates to the position of the one or more objects and to turn on when the laser device rotates past the position of the one or more objects.

* * * * *